(12) United States Patent
Furusato et al.

(10) Patent No.: US 9,102,869 B2
(45) Date of Patent: *Aug. 11, 2015

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yoshimasa Furusato, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/825,976

(22) PCT Filed: Feb. 8, 2013

(86) PCT No.: PCT/JP2013/053116
§ 371 (c)(1),
(2) Date: Mar. 26, 2013

(87) PCT Pub. No.: WO2013/125379
PCT Pub. Date: Aug. 29, 2013

(65) Prior Publication Data
US 2014/0097383 A1  Apr. 10, 2014

(30) Foreign Application Priority Data
Feb. 23, 2012 (JP) .................. 2012-037008

(51) Int. Cl.
| | |
|---|---|
| C09K 19/34 | (2006.01) |
| C09K 19/30 | (2006.01) |
| G02F 1/139 | (2006.01) |
| C09K 19/12 | (2006.01) |
| G02F 1/00 | (2006.01) |

(52) U.S. Cl.
CPC ......... *C09K 19/3402* (2013.01); *C09K 19/3003* (2013.01); *C09K 19/3066* (2013.01); *C09K 19/3068* (2013.01); *G02F 1/139* (2013.01); *C09K 2019/123* (2013.01); *C09K 2019/301* (2013.01); *C09K 2019/3004* (2013.01); *C09K 2019/3037* (2013.01); *C09K 2019/3071* (2013.01); *C09K 2019/3422* (2013.01); *C09K 2019/3425* (2013.01); *G02F 1/0045* (2013.01)

(58) Field of Classification Search
CPC ........... C09K 2019/0448; C09K 19/42; C09K 19/44; C09K 19/3003; G02F 1/1337
USPC ........................................ 252/299.61, 299.63
See application file for complete search history.

(56) References Cited

U.S. PATENT DOCUMENTS

| | | | |
|---|---|---|---|
| 2003/0222245 A1* | 12/2003 | Klasen-Memmer et al. | 252/299.66 |
| 2006/0263544 A1* | 11/2006 | Klasen-Memmer et al. | 428/1.1 |
| 2009/0309066 A1* | 12/2009 | Klasen-Memmer et al. | 252/299.61 |

FOREIGN PATENT DOCUMENTS

| | | |
|---|---|---|
| JP | 2008-505228 | 2/2008 |
| JP | 2008-505235 | 2/2008 |
| WO | 2011/098202 | 8/2011 |

OTHER PUBLICATIONS

"International Search Report (Form PCT/ISA/210)", mailed on Mar. 5, 2013, p. 1-p. 2.
"Written Opinion of the International Searching Authority (Form PCT/ISA/237)", mailed on Mar. 5, 2013, p. 1-p. 4.
International Preliminary Report on Patentability; this report contains the following items :Form PCT/IB/373, PCT/ISA237(cover sheet), PCT/ISA237(Box No. I),PCT/ISA237(Box No. V), PCT/ISA237(Box No. VIII),, mailed on Aug. 26, 2014, which is English translation of "Written Opinion of the International Searching Authority", p. 1-p. 5.

* cited by examiner

*Primary Examiner* — Chanceity Robinson
(74) *Attorney, Agent, or Firm* — Jianq Chyun IP Office

(57) ABSTRACT

A liquid crystal composition and an AM liquid crystal display device are described. The liquid crystal composition contains a specific compound having a small viscosity as a first component, may further contain a specific compound having a large negative dielectric anisotropy as a second component and a specific compound having a small viscosity as a third component, and has a negative dielectric anisotropy and a ratio of rotational viscosity to an elastic constant in the range of 4.2 GPa·s/N or lower. The liquid crystal display device includes the composition.

9 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of the International Patent Application No. PCT/JP2013/053116 filed on Feb. 8, 2013, which claims the priority benefit of Japan Patent Application No. 2012-037008 filed on Feb. 23, 2012. The entirety of each of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth containing the composition. In particular, the invention relates to a liquid crystal composition having a negative dielectric anisotropy, and a device or the like that contains the composition and has an in-plane switching (IPS) mode, a vertical alignment (VA) mode, a fringe field switching (FFS) mode, a polymer sustained alignment (PSA) mode or a field induced photo-reactive alignment (FPA) mode.

BACKGROUND ART

In a liquid crystal display device, a classification based on the operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, a polymer sustained alignment (PSA) mode and a field induced photo-reactive alignment (FPA) mode. A classification based on the driving mode in the device includes passive matrix (PM) and active matrix (AM) types. The PM type is classified into static and multiplex types, etc. The AM type is classified into thin film transistor (TFT) and metal insulator metal (MIM) types, etc. The TFT type is further classified into amorphous silicon and polycrystal silicon types, wherein the latter is classified into a high temperature type and a low temperature type according to the production process. A classification based on the light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes the relationship between the general characteristics of the two aspects. The general characteristics of the composition will be further explained based on a commercially available AM device. The temperature range of the nematic phase relates to the temperature range in which the device can be used. The preferred maximum temperature of the nematic phase is about 70° C. or higher and the preferred minimum temperature of the same is about −20° C. or lower. The viscosity of the composition relates to the response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
| --- | --- | --- |
| 1 | Wide temperature range of a nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage, Small electric power consumption, Large contrast ratio |
| 5 | Large specific resistance | Large voltage holding ratio, large contrast ratio |
| 6 | High stability to ultraviolet light and heat | Long service life |
| 7 | Large elastic constant | Short response time, large contrast ratio |

[1] A liquid crystal composition can be injected into a liquid crystal cell in a shorter period of time.

An optical anisotropy of the composition relates to a contrast ratio in the device. A product (Δn×d) of the optical anisotropy (Δn) of the composition and a cell gap (d) in the device is designed so as to maximize the contrast ratio. A suitable value of the product depends on a type of the operating mode. The suitable value is in the range of about 0.30 micrometer to about 0.40 micrometer in a device having the VA mode, and in the range of about 0.20 micrometer to about 0.30 micrometer in a device having the IPS mode or the FFS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of the dielectric anisotropy is preferred. A large specific resistance in the composition contributes to a large voltage holding ratio and a large contrast ratio in the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to ultraviolet light and heat relates to a service life of the liquid crystal display device. In the case where the stability is high, the device has a long service life. Such characteristics are preferred for an AM device for use in a liquid crystal projector, a liquid crystal television and so forth. A large elastic constant in the composition contributes to a short response time and a large contrast ratio in the device. Therefore, a large elastic constant is preferred. A small ratio of viscosity to an elastic constant in the composition contributes to a short response time in the device. Therefore, the small ratio of the viscosity to the elastic constants is preferred.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode or the FPA mode. Examples of the liquid crystal composition are disclosed in Patent literature No. 1 to Patent literature No. 3.

CITATION LIST

Patent Literature

Patent literature No. 1: WO 2011-98202 A.
Patent literature No. 2: JP 2008-505235 A.
Patent literature No. 3: JP 2008-505228 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light, a high stability to heat, a large elastic constant and a small ratio of viscosity to an elastic constant.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light, a high stability to heat, a large elastic constant and a small ratio of viscosity to an elastic constant. Another aim is to provide a liquid crystal composition having a suitable balance regarding at least two of the characteristics, in particular a liquid crystal composition satisfying a small viscosity, a large elastic constant and a large negative dielectric anisotropy. A further aim is to provide a liquid crystal display device including such a composition. An additional aim is to provide a composition having characteristics such as a suitable optical anisotropy to be a small optical anisotropy or a large optical anisotropy, a large negative dielectric anisotropy and a high stability to ultraviolet light, and is to provide an AM device having characteristics such as a short response time, a large voltage holding ratio, a large contrast ratio and a long service life.

Solution to Problem

The invention concerns a liquid crystal composition that has a negative dielectric anisotropy and a ratio of rotational viscosity (γ1) to an elastic constant (K33) in the range of 4.2 GPa·s/N or less, and contains at least one compound selected from the group of compounds represented by formula (1) as a first component, and concerns a liquid crystal display device including the liquid crystal composition:

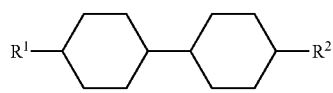

(1)

wherein $R^1$ is independently alkyl having 1 to 12 carbons, alkoxy having 1 to 12 carbons, alkenyl having 2 to 12 carbons, or alkyl having 1 to 12 carbons in which at least one of hydrogen is replaced by fluorine; and $R^2$ is independently alkenyl having 2 to 12 carbons, or alkenyl having 2 to 12 carbons in which at least one of hydrogen is replaced by fluorine.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light, a high stability to heat, a large elastic constant and a small ratio of viscosity to an elastic constant. One aspect of the invention is a liquid crystal composition having a suitable balance regarding at least two of the characteristics. Another aspect is a liquid crystal display device including such a composition. A further aspect is a composition having a suitable optical anisotropy, a large negative dielectric anisotropy, a high stability to ultraviolet light, and so forth, and is an AM device having a short response time, a large voltage holding ratio, a large contrast ratio, a long service life and so forth.

PREFERRED EMBODIMENTS OF THE INVENTION

Usage of terms herein is as described below. A liquid crystal composition or a liquid crystal display device according to the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound and a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1). A same rule applies to any other compound represented by any other formula. An expression "at least one" in the context of "replaced" shows that not only a position but also the number can be freely selected.

A higher limit of a temperature range of the nematic phase may be occasionally abbreviated as "maximum temperature." A lower limit of the temperature range of the nematic phase may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of weight percent (wt %) of the first component based on the total weight of the liquid crystal composition. A ratio of a second component or the like is also expressed in a similar manner. A ratio of the additive mixed with the composition is expressed in terms of weight percent (wt %) or weight parts per million (ppm) based on the total weight of the liquid crystal composition.

A symbol $R^1$ is used for a plurality of compounds in chemical formulas of component compounds. In two of arbitrary compounds among the plurality of compounds, a group to be selected by $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule applies to a symbol $R^3$, $R^4$ or the like.

The invention includes the items described below. Item 1. A liquid crystal composition that has a negative dielectric anisotropy and a ratio of rotational viscosity (γ1) to an elastic constant (K33) in the range of 4.2 GPa·s/N or less, and contains at least one compound selected from the group of compounds represented by formula (1) as a first component:

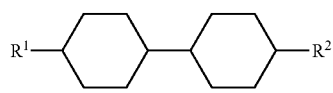

(1)

wherein $R^1$ is independently alkyl having 1 to 12 carbons, alkoxy having 1 to 12 carbons, alkenyl having 2 to 12 carbons, or alkyl having 1 to 12 carbons in which at least one of hydrogen is replaced by fluorine; and $R^2$ is independently alkenyl having 2 to 12 carbons, or alkenyl having 2 to 12 carbons in which at least one of hydrogen is replaced by fluorine.

Item 2. The liquid crystal composition according to item 1, wherein the first component is at least one compound selected from the group of compounds represented by formula (1-1) to formula (1-3):

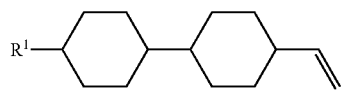

(1-1)

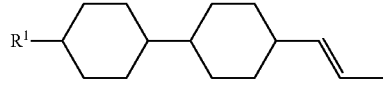

(1-2)

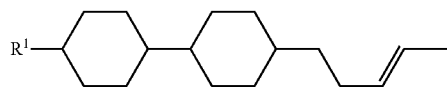

(1-3)

wherein $R^1$ is independently alkyl having 1 to 12 carbons, alkoxy having 1 to 12 carbons, alkenyl having 2 to 12 carbons, or alkyl having 1 to 12 carbons in which at least one of hydrogen is replaced by fluorine.

Item 3. The liquid crystal composition according to item 1, wherein the first component is at least one compound selected from the group of compounds represented by formula (1-1) according to item 2.

Item 4. The liquid crystal composition according to item 1, wherein the first component is at least one compound selected from the group of compounds represented by formula (1-2) according to item 2.

Item 5. The liquid crystal composition according to item 1, wherein the first component is a mixture of at least one compound selected from the group of compounds represented by formula (1-1) according to item 2 and at least one compound selected from the group of compounds represented by formula (1-2) according to item 2.

Item 6. The liquid crystal composition according to any one of items 1 to 5, wherein a ratio of the first component is in the range of 15 wt % to 90 wt % based on the total weight of the liquid crystal composition.

Item 7. The liquid crystal composition according to any one of items 1 to 6, wherein a ratio of the compound represented by formula (1-2) is in the range of 15 wt % to 40 wt % based on the total weight of the liquid crystal composition.

Item 8. The liquid crystal composition according to any one of items 1 to 7, further containing at least one compound selected from the group of compounds represented by formula (2) as a second component:

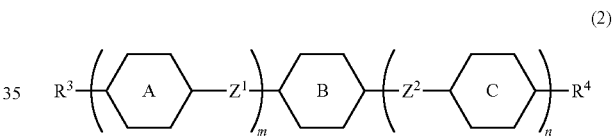

(2)

wherein $R^3$ and $R^4$ are independently alkyl having 1 to 12 carbons, alkoxy having 1 to 12 carbons, alkenyl having 2 to 12 carbons, alkenyloxy having 2 to 12 carbons, alkyl having 1 to 12 carbons in which at least one of hydrogen is replaced by fluorine, or alkenyl having 2 to 12 carbons in which at least one of hydrogen is replaced by fluorine; ring A and ring C are independently 1,4-cyclohexylene, 1,4-phenylene, 1,4-phenylene in which at least one of hydrogen is replaced by fluorine or chlorine, or tetrahydropyran-2,5-diyl; ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^1$ and $Z^2$ are independently a single bond, ethylene, methyleneoxy or carbonyloxy; m is 1, 2 or 3; and n is 0 or 1, and a sum of m and n is 3 or less.

Item 9. The liquid crystal composition according to item 8, wherein the second component is at least one compound selected from the group of compounds represented by formula (2-1) to formula (2-19):

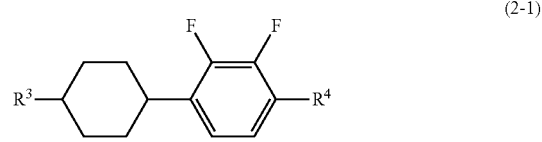

(2-1)

-continued

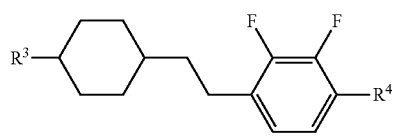 (2-2)

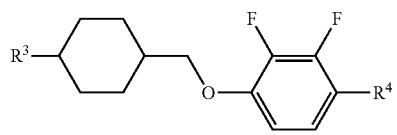 (2-3)

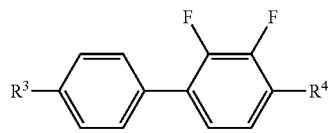 (2-4)

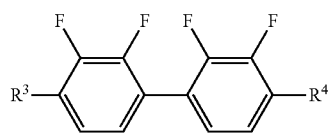 (2-5)

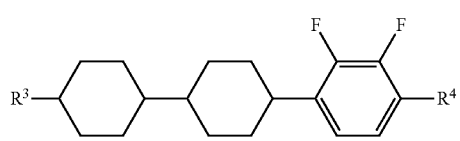 (2-6)

 (2-7)

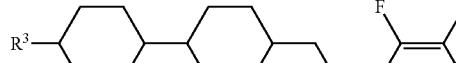 (2-8)

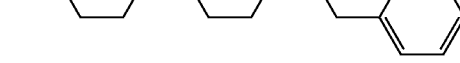 (2-9)

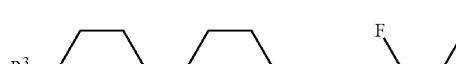 (2-10)

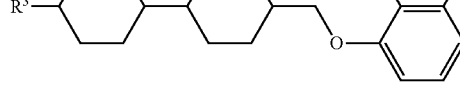 (2-11)

 (2-12)

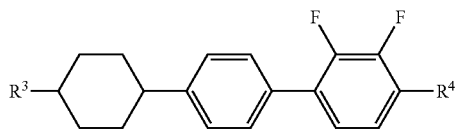 (2-13)

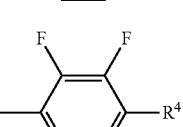 (2-14)

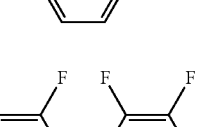 (2-15)

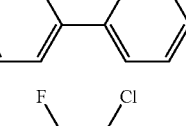 (2-16)

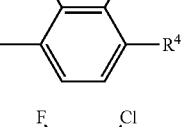 (2-17)

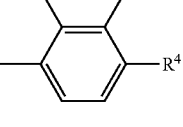 (2-18)

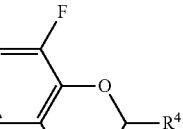 (2-19)

wherein $R^3$ and $R^4$ are independently alkyl having 1 to 12 carbons, alkoxy having 1 to 12 carbons, alkenyl having 2 to 12 carbons, alkenyloxy having 2 to 12 carbons, alkyl having 1 to 12 carbons in which at least one of hydrogen is replaced by fluorine, or alkenyl having 2 to 12 carbons in which at least one of hydrogen is replaced by fluorine.

Item 10. The liquid crystal composition according to item 8, wherein the second component is at least one compound selected from the group of compounds represented by formula (2-1) according to item 9.

Item 11. The liquid crystal composition according to item 8, wherein the second component is at least one compound selected from the group of compounds represented by formula (2-9) according to item 9.

Item 12. The liquid crystal composition according to item 8, wherein the second component is a mixture of at least one compound selected from the group of compounds represented by formula (2-1) according to item 9 and at least one compound selected from the group of compounds represented by formula (2-13) according to item 9.

Item 13. The liquid crystal composition according to item 8, wherein the second component is a mixture of at least one compound selected from the group of compounds represented by formula (2-4) according to item 9 and at least one compound selected from the group of compounds represented by formula (2-6) according to item 9.

Item 14. The liquid crystal composition according to item 8, wherein the second component is a mixture of at least one compound selected from the group of compounds represented by formula (2-4) according to item 9 and at least one compound selected from the group of compounds represented by formula (2-8) according to item 9.

Item 15. The liquid crystal composition according to any one of items 8 to 14, wherein a ratio of the second component is in the range of 10 wt % to 85 wt % based on the total weight of the liquid crystal composition.

Item 16. The liquid crystal composition according to any one of items 1 to 15, further containing at least one compound selected from the group of compounds represented by formula (3) as a third component:

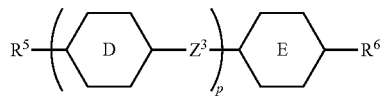

(3)

wherein $R^5$ and $R^6$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring D and ring E are independently 1,4-cyclohexylene, 1,4-phenylene, 2-fluoro-1,4-phenylene or 3-fluoro-1,4-phenylene, and when p is 1, ring E is 1,4-phenylene; $Z^3$ is independently a single bond, ethylene, methyleneoxy or carbonyloxy; and p is 1, 2 or 3.

Item 17. The liquid crystal composition according to item 16, wherein the third component is at least one compound selected from the group of compounds represented by formula (3-1) to formula (3-12):

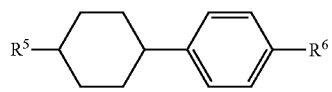

(3-1)

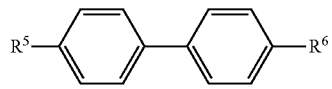

(3-2)

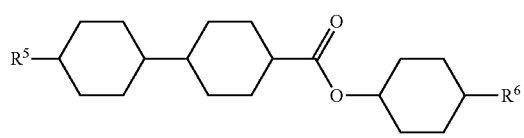

(3-3)

(3-4)

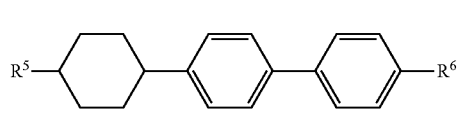

(3-5)

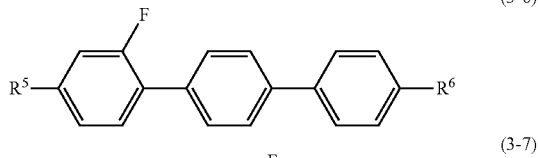

(3-6)

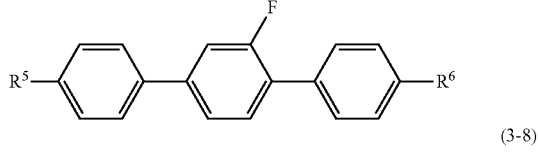

(3-7)

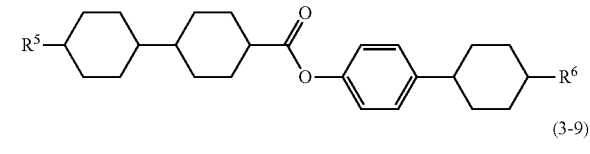

(3-8)

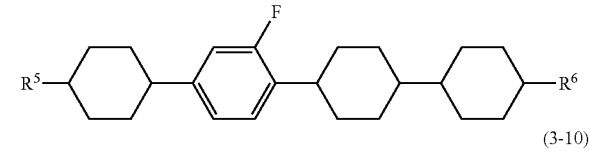

(3-9)

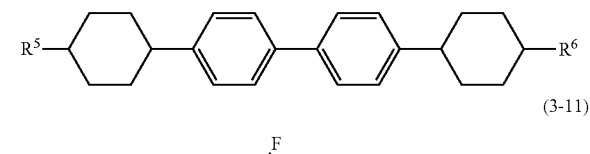

(3-10)

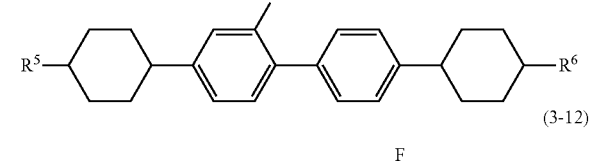

(3-11)

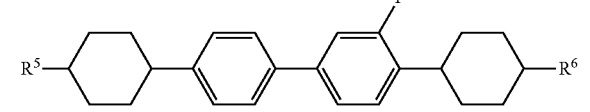

(3-12)

wherein $R^5$ and $R^6$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 18. The liquid crystal composition according to item 16, wherein the third component is at least one compound selected from the group of compounds represented by formula (3-4) according to item 17.

Item 19. The liquid crystal composition according to item 16, wherein the third component is at least one compound selected from the group of compounds represented by formula (3-7) according to item 17.

Item 20. The liquid crystal composition according to item 16, wherein the third component is a mixture of at least one compound selected from the group of compounds represented by formula (3-4) according to item 17 and at least one compound selected from the group of compounds represented by formula (3-7) according to item 17.

Item 21. The liquid crystal composition according to any one of items 16 to 20, wherein a ratio of the third component is in the range of 5 wt % to 40 wt % based on the total weight of the liquid crystal composition.

Item 22. The liquid crystal composition according to any one of items 1 to 21, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

Item 23. A liquid crystal display device, including the liquid crystal composition according to any one of items 1 to 22.

Item 24. The liquid crystal display device according to item 23, wherein an operating mode in the liquid crystal display device is a VA mode, an IPS mode, a PSA mode or an FPA mode, and a driving mode in the liquid crystal display device is an active matrix mode.

Item 25. Use of the liquid crystal composition according to any one of items 1 to 22 in the liquid crystal display device.

The invention further includes the following items: (1) the composition, further containing the optically active compound; (2) the composition, further containing the additive such as an antioxidant, an ultraviolet light absorber or an antifoaming agent; (3) an AM device including the composition; (4) a device including the composition, and having a TN, ECB, OCB, IPS, FFS, VA, PSA or FPA mode; (5) a transmissive device, including the composition; (6) use of the composition as the composition having the nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive or an impurity in addition to the liquid crystal compound selected from compound (1), compound (2) and compound (3). "Any other liquid crystal compound" means a liquid crystal compound different from compound (1), compound (2) and compound (3). Such a compound is mixed with the composition for the purpose of further adjusting the characteristics. Of any other liquid crystal compounds, a ratio of a cyano compound is preferably as small as possible in view of stability to heat or ultraviolet light. A further preferred ratio of the cyano compound is 0 wt %. The additive includes the optically active compound, the antioxidant, the ultraviolet light absorber, a dye, the antifoaming agent, the polymerizable compound and a polymerization initiator. The impurity includes a compound mixed in a process such as preparation of the component compounds. Even in the case where the compound is liquid crystalline, the compound is classified as the impurity herein.

Composition B consists essentially of compounds selected from compound (1), compound (2) and compound (3). A term "essentially" means that the composition does not contain any liquid crystal compound different from the compounds, excluding the additive and the impurity. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is nearly zero."

TABLE 2

| Characteristics of Compounds | | | |
|---|---|---|---|
| Compounds | Compound (1) | Compound (2) | Compound (3) |
| Maximum temperature | S to M | S to L | S to L |
| Viscosity | S | M to L | S to M |
| Optical anisotropy | S | M to L | S to L |
| Dielectric anisotropy | 0 | M to L[1)] | 0 |
| Specific resistance | L | L | L |

[1)]A value of Dielectric anisotropy is negative, and the symbol shows magnitude of an absolute value.

Upon mixing the component compounds with the composition, the main effects of the component compounds on the characteristics of the composition are as described below. Compound (1) decreases the viscosity or increases the elastic constant. Compound (2) increases the absolute value of dielectric anisotropy or decreases the minimum temperature. Compound (3) decreases the viscosity or increases the maximum temperature.

Third, the combination of components in the composition, the preferred ratio of the component compounds and the basis thereof will be explained. The combination of components in the composition includes a combination of the first component and the second component, a combination of the first component and the third component, and a combination of the first component, the second component and the third component. A preferred combination of components in the composition includes the combination of the first component, the second component and the third component.

A preferred ratio of the first component is about 15 wt % or more for decreasing the viscosity or increasing the elastic constant, and about 90 wt % or less for decreasing the minimum temperature. A further preferred ratio is in the range of about 20 wt % to about 80 wt %. A particularly preferred ratio is in the range of about 30 wt % to about 60 wt %.

In order to decrease the ratio of the rotational viscosity to the elastic constant, the compound represented by formula (1-2) is preferably mixed as the first component. A preferred ratio of the compound represented by formula (1-2) is about 15 wt % or more for increasing the elastic constant, and about 40 wt % or less for decreasing the minimum temperature.

A preferred ratio of the second component is about 10 wt % or more for increasing the absolute value of dielectric anisotropy, and about 85 wt % or less for decreasing the viscosity. A further preferred ratio is in the range of about 20 wt % to about 75 wt %. A particularly preferred ratio is in the range of about 30 wt % to about 70 wt %.

A preferred ratio of the third component is about 5 wt % or more for increasing the maximum temperature or decreasing the viscosity, and about 40% or less for decreasing the minimum temperature. A further preferred ratio is in the range of about 5 wt % to about 35 wt %. A particularly preferred ratio is in the range of about 5 wt % to about 30 wt %.

Fourth, the preferred embodiment of the component compounds will be explained.

$R^1$ is alkyl having 1 to 12 carbons, alkoxy having 1 to 12 carbons, alkenyl having 2 to 12 carbons, or alkyl having 1 to 12 carbons in which at least one of hydrogen is replaced by fluorine. Preferred $R^1$ is alkyl having 1 to 12 carbons for increasing the maximum temperature and increasing the stability to ultraviolet light, and so forth or increasing the stability to heat.

$R^2$ is alkenyl having 2 to 12 carbons, or alkenyl having 2 to 12 carbons in which at least one of hydrogen is replaced by fluorine. Preferred $R^2$ is alkenyl having 2 to 12 carbons for decreasing the viscosity or increasing the elastic constant.

$R^3$ and $R^4$ are independently alkyl having 1 to 12 carbons, alkoxy having 1 to 12 carbons, alkenyl having 2 to 12 carbons, alkenyloxy having 2 to 12 carbons, alkyl having 1 to 12 carbons in which at least one of hydrogen was replaced by fluorine, or alkenyl having 2 to 12 carbons in which at least one of hydrogen is replaced by fluorine. Preferred $R^3$ or $R^4$ is alkyl having 1 to 12 carbons for increasing the stability to ultraviolet light, and so forth or increasing the stability to heat, and alkoxy having 1 to 12 carbons for increasing the absolute value of dielectric anisotropy.

$R^5$ and $R^6$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^5$ or $R^6$ is alkyl having 1 to 12 carbons for increasing the stability to ultraviolet light, and so forth or increasing the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity. In the alkyl, straight-chain alkyl is preferred to branched-chain alkyl.

Preferred examples of alkyl in which at least one of hydrogen is replaced by fluorine include fluoromethyl, 2-fluoroethyl, 3-fluoropropyl, 4-fluorobutyl, 5-fluoropentyl, 6-fluorohexyl, 7-fluoroheptyl and 8-fluorooctyl. Further preferred examples include 2-fluoroethyl, 3-fluoropropyl, 4-fluorobutyl and 5-fluoropentyl for decreasing a threshold voltage.

Preferred alkoxy is methoxy, ethoxy, propoxy, butoxy, pentyloxy, hexyloxy or heptyloxy. Further preferred alkoxy is methoxy or ethoxy for decreasing the viscosity. In the alkoxy, straight-chain alkoxy is preferred to branched-chain alkoxy.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity. In the alkenyloxy, straight-chain alkenyloxy is preferred to branched-chain alkenyloxy.

Alkyl does not include cyclic alkyl. Alkoxy does not include cyclic alkoxy. Alkenyl does not include cyclic alkenyl. Alkenyloxy does not include cyclic alkenyloxy.

Ring A and ring C are independently 1,4-cyclohexylene, 1,4-phenylene, 1,4-phenylene in which at least one of hydrogen is replaced by fluorine or chlorine, or tetrahydropyran-2,5-diyl, and two of arbitrary ring A when m is 2 or 3 may be identical or different. Ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring A or ring C is 1,4-cyclohexylene for decreasing the viscosity. Preferred ring B is 2,3-difluoro-1,4-phenylene for decreasing the viscosity and increasing the absolute value of dielectric anisotropy.

Tetrahydropyran-2,5-diyl includes:

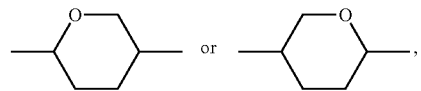

preferably

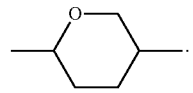

Tetrahydropyran-2,5-diyl is left-right asymmetrical. However, as a definition, the rings can be located not only in a direction defined but also in a reversed left-right direction as described above. The definition also applies to any other ring in which only one direction is defined in a left-right asymmetrical ring.

Ring D and ring E are independently 1,4-cyclohexylene, 1,4-phenylene, 2-fluoro-1,4-phenylene or 3-fluoro-1,4-phenylene, ring E when p is 1 is 1,4-phenylene and two of arbitrary ring D when p is 2 or 3 may be identical or different. Preferred ring D or ring E is 1,4-cyclohexylene for decreasing the viscosity, and 1,4-phenylene for increasing the optical anisotropy. With regard to a configuration of 1,4-cyclohexylene, trans is preferred to cis for increasing the maximum temperature. Then, "2-fluoro-1,4-phenylene" or the like is represented by a ring in which a left-hand side is defined as 1-position to show a difference in a position of fluorine between "2-fluoro-1,4-phenylene" and "3-fluoro-1,4-phenylene."

$Z^1$, $Z^2$ and $Z^3$ are independently a single bond, ethylene, methyleneoxy or carbonyloxy, two of arbitrary $Z^1$ when m is 2 or 3 may be identical or different, and two of arbitrary $Z^3$ when p is 2 or 3 may be identical or different. Preferred $Z^1$ or $Z^2$ is a single bond for decreasing the viscosity, and methyleneoxy for increasing the absolute value of dielectric anisotropy. Preferred $Z^3$ is a single bond for decreasing the viscosity.

Then, m is 1, 2 or 3, n is 0 or 1, and a sum of m and n is 3 or less. Preferred m is 1 for decreasing the minimum temperature. Preferred n is 0 for decreasing the viscosity. Moreover, p is 1, 2 or 3. Preferred p is 1 for decreasing the viscosity, and 3 for increasing the maximum temperature.

Fifth, the specific examples of the component compounds will be shown. In preferred compounds as described below, $R^7$ is straight-chain alkyl having 1 to 12 carbons. $R^8$ and $R^9$ are independently straight-chain alkyl having 1 to 12 carbons or straight-chain alkenyl having 2 to 12 carbons. $R^{10}$ is straight-chain alkyl having 1 to 12 carbons or straight-chain alkoxy having 1 to 12 carbons.

Preferred compound (1) includes compound (1-1-1) to compound (1-3-1). Further preferred compound (1) includes compound (1-1-1) and compound (1-2-1). Particularly preferred compound (1) includes compound (1-2-1). Preferred compound (2) includes compound (2-1-1) to compound (2-19-1). Further preferred compound (2) includes compound (2-1-1), compound (2-2-1), compound (2-4-1), compound (2-6-1), compound (2-8-1), compound (2-9-1) and compound (2-13-1). Particularly preferred compound (2) includes compound (2-1-1), compound (2-4-1), compound (2-6-1), compound (2-8-1) and compound (2-9-1). Preferred compound (3) includes compound (3-1-1) to compound (3-12-1). Further preferred compound (3) includes compound (3-2-1), compound (3-4-1), compound (3-6-1) and compound (3-7-1). Particularly preferred compound (3) includes compound (3-4-1) and compound (3-7-1).

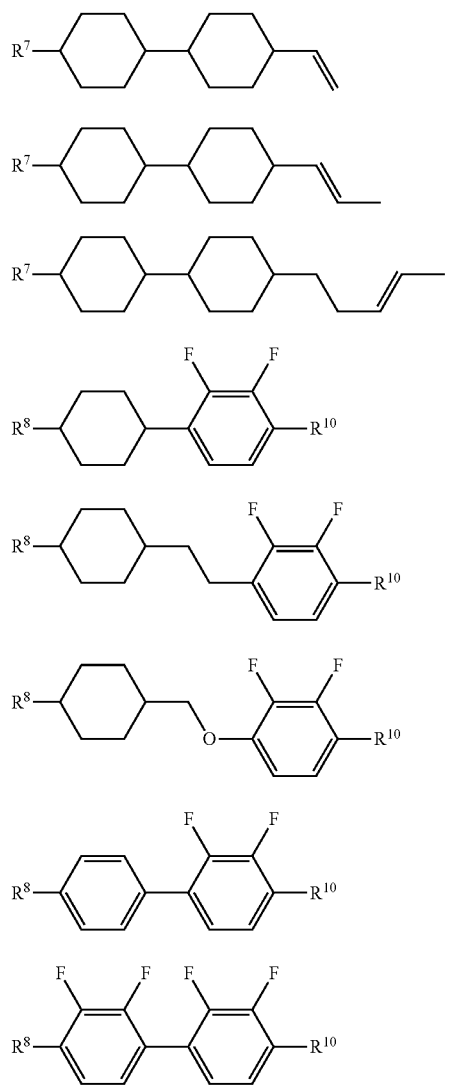

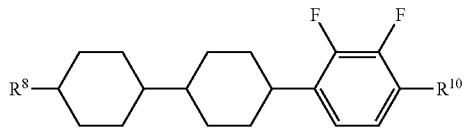

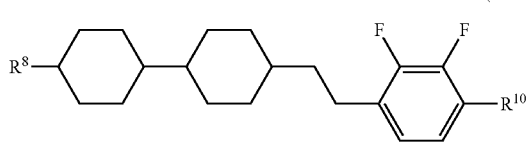

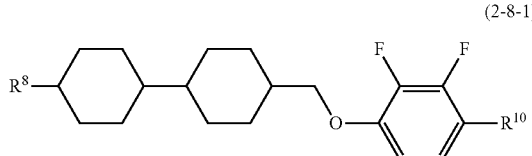

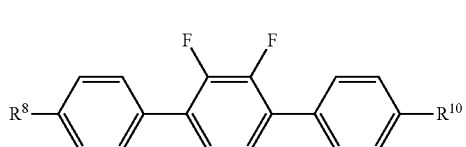

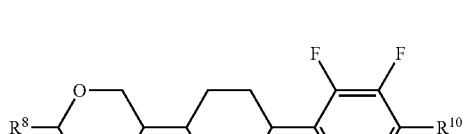

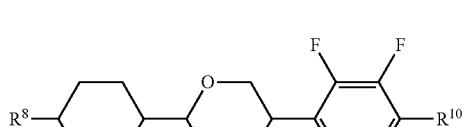

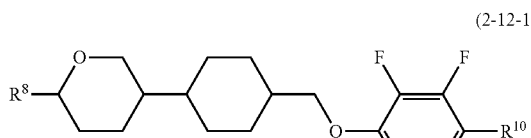

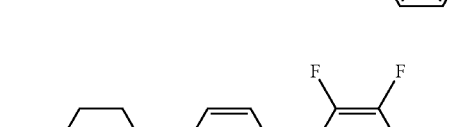

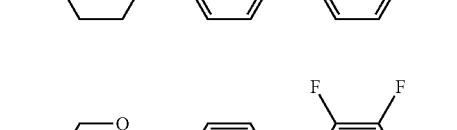

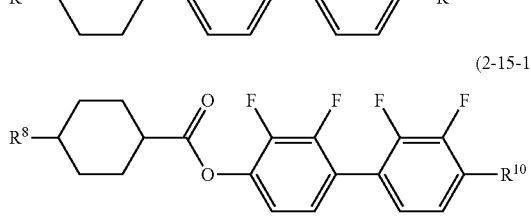

(2-16-1)
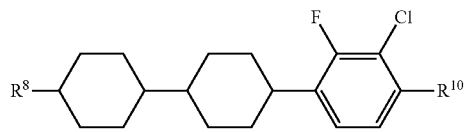

(2-17-1)
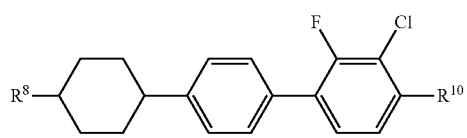

(2-18-1)
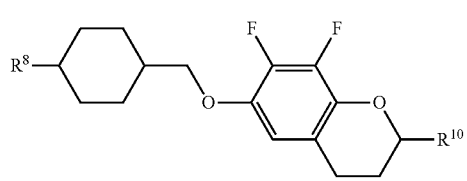

(2-19-1)
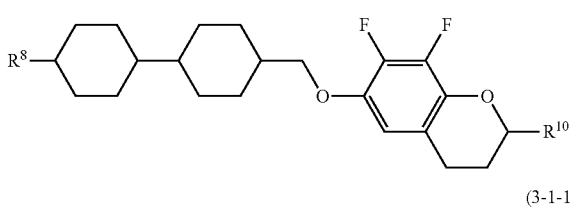

(3-1-1)
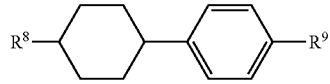

(3-2-1)
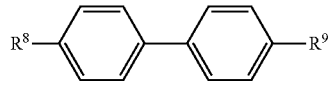

(3-3-1)
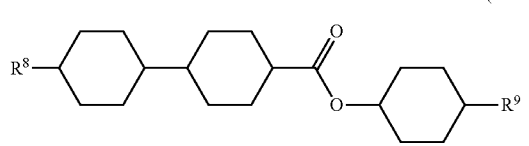

(3-4-1)
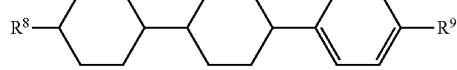

(3-5-1)

(3-6-1)
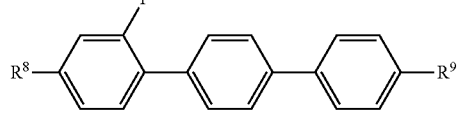

(3-7-1)
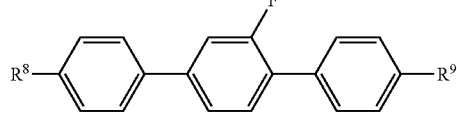

(3-8-1)
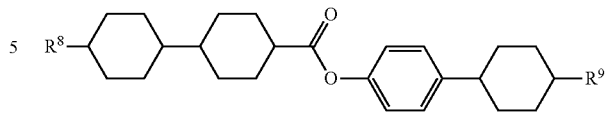

(3-9-1)
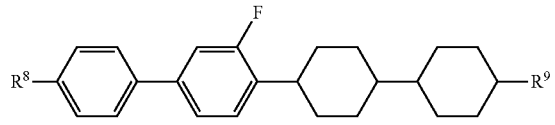

(3-10-1)
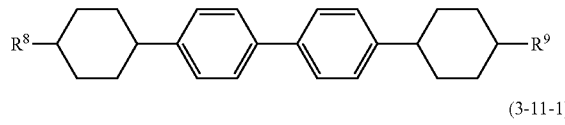

(3-11-1)
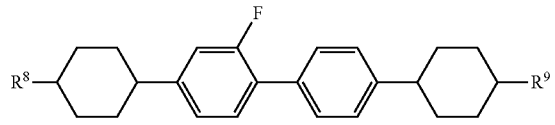

(3-12-1)
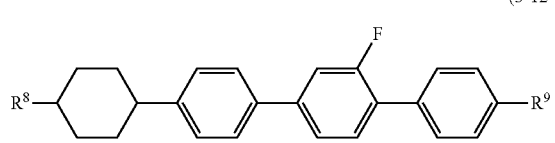

Sixth, the additive that may be mixed with the composition will be explained. Such an additive includes the optically active compound, the antioxidant, the ultraviolet light absorber, the dye, the antifoaming agent, the polymerizable compound and the polymerization initiator. The optically active compound is mixed with the composition for the purpose of inducing a helical structure in liquid crystals to give a twist angle. Examples of such a compound include compound (4-1) to compound (4-5). A preferred ratio of the optically active compound is about 5 wt % or less. A further preferred ratio is in the range of about 0.01 wt % to about 2 wt %.

(4-1)
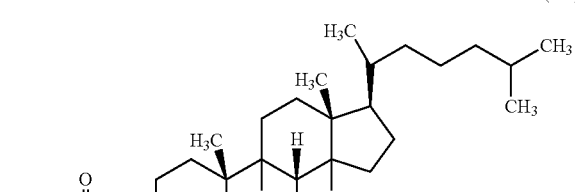

(4-2)
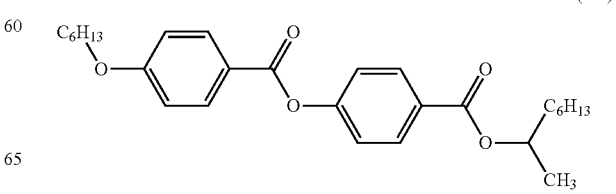

-continued

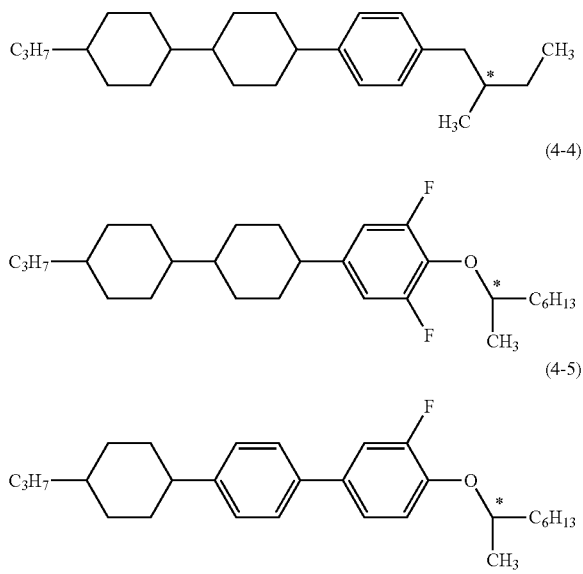

The antioxidant is mixed with the composition for the purpose of preventing a decrease in the specific resistance as caused by heating in air, or maintaining a large voltage holding ratio at room temperature and also at a temperature close to the maximum temperature of the nematic phase after the device has been used for a long period of time.

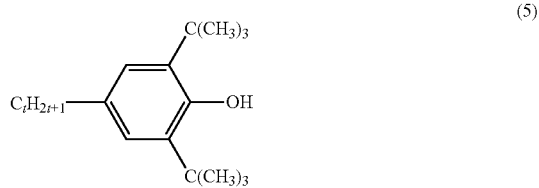

Preferred examples of the antioxidant include compound (5) where t is an integer from 1 to 9. In compound (5), preferred t is 1, 3, 5, 7 or 9. Further preferred t is 1 or 7. Compound (5) where t is 1 is effective in preventing a decrease in the specific resistance as caused by heating in air because compound (5) has a large volatility. Compound (5) where t is 7 is effective in maintaining a large voltage holding ratio at room temperature and also at a temperature close to the maximum temperature of the nematic phase even after the device has been used for a long period of time because compound (5) has a small volatility. A preferred ratio of the antioxidant is about 50 ppm or more for achieving the effect thereof, and about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01 wt % to about 10 wt %. The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The polymerizable compound is mixed with the composition to be adapted for the device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred ratio of the polymerizable compound is about 0.05 wt % or more for achieving the effect thereof, and about 10 wt % or less for avoiding a poor display. A further preferred ratio is in the range of about 0.1 wt % to about 2 wt %. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to a person skilled in the art and are described in literatures. For example, Irgacure 651 (registered trademark; BASF), Irgacure 184 (registered trademark; BASF) or Darocure 1173 (registered trademark; BASF), each being the photopolymerization initiator, is suitable for radical polymerization. A preferred ratio of the photopolymerization initiator is in the range of about 0.1 wt % to about 5 wt % based on the polymerizable compound, and a particularly preferred ratio is in the range of about 1 wt % to about 3 wt %.

Seventh, the methods for synthesizing the component compounds will be explained. The compounds can be prepared according to known methods. Examples of synthetic methods will be shown. Compound (1-1-1), compound (1-2-1) and compound (3-4-1) are prepared by the method described in JP S59-176221 A (1984). Compound (2-1-1) is prepared by the method described in JP 2000-053602 A (2000). The antioxidant is commercially available. A compound represented by formula (5) where t is 1 is available from Sigma-Aldrich Corporation. Compound (5) where t is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. The composition of the invention mainly has a minimum temperature of about −10° C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. A composition having an optical anisotropy in the range of about 0.08 to about 0.25, and also a composition having an optical anisotropy in the range of about 0.10 to about 0.30 may be prepared by controlling the ratio of the component compounds or by mixing with any other liquid crystal compound. The composition can be used as the composition having the nematic phase and as the optically active composition by adding the optically active compound.

A preferred minimum temperature of the nematic phase of the liquid crystal composition of the invention is at least about 0° C. or lower, a further preferred minimum temperature of the nematic phase is about −20° C. or lower, and a particularly preferred minimum temperature of the nematic phase is about −30° C. or lower.

A preferred maximum temperature of the nematic phase of the liquid crystal composition of the invention is at least about 70° C. or higher, a further preferred maximum temperature of the nematic phase is about 75° C. or higher, and a particularly preferred maximum temperature of the nematic phase is about 80° C. or higher.

A preferred optical anisotropy of the liquid crystal composition of the invention, at 25° C. and at 589 nanometers, is in the range of about 0.07 to about 0.20, a further preferred optical anisotropy is in the range of about 0.07 to about 0.16, and a particularly preferred optical anisotropy is in the range of about 0.08 to about 0.12.

A preferred absolute value of dielectric anisotropy of the liquid crystal composition of the invention, at 25° C., is at least about 1.5 or more, a further preferred absolute value of the dielectric anisotropy is about 2 or more, and a particularly preferred absolute value of the dielectric anisotropy is about 2.5 or more.

The composition can be used for the AM device. The composition can also be used for a PM device. The composition can also be used for an AM device and a PM device having a mode such as PC, TN, STN, ECB, OCB, IPS, FFS, VA, PSA or FPA. Use for the AM device having the IPS, FFS or VA mode is particularly preferred. The devices may be of a reflective type, a transmissive type or a transflective type. Use for a transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

EXAMPLES

When a sample was a composition, the sample was measured as is, and values obtained were described. When a sample was a compound, a sample was prepared by mixing the compound (15 wt %) with mother liquid crystals (85 wt %). Values of characteristics of the compound were calculated using values obtained by measurement, according to an extrapolation method: (extrapolated value)={(measured value of a sample)−0.85×(measured value of mother liquid crystals)}/0.15. When a smectic phase (or crystals) precipitated at the above ratio at 25° C., a ratio of the compound to the mother liquid crystals was changed step by step in the order of (10 wt %:90 wt %), (5 wt %:95 wt %) and (1 wt %:99 wt %). Values of a maximum temperature, an optical anisotropy, viscosity and a dielectric anisotropy with regard to the compound were determined according to the extrapolation method.

Components of the mother liquid crystal were as described below. A ratio of each component is expressed in terms of wt %.

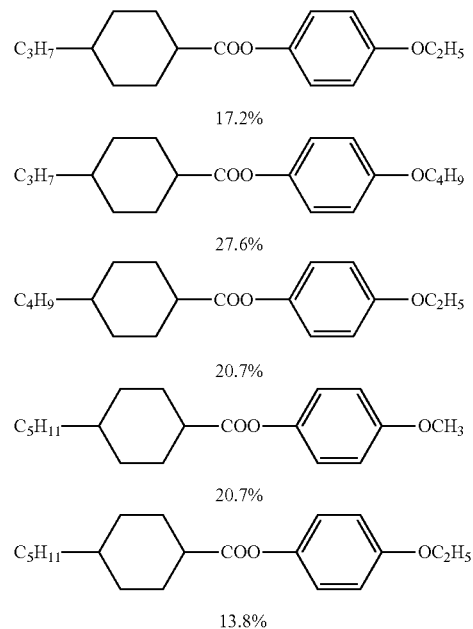

The characteristics were measured according to the methods as described below. Most of the methods are applied as described in the Standard of Japan Electronics and Information Technology Industries Association (hereafter abbreviated as JEITA) discussed and established as the Standard of JEITA (JEITA ED-2521B), or as modified thereon.

Maximum Temperature of a Nematic Phase (NI; ° C.): A sample was placed on a hot plate in a melting point apparatus equipped with a polarizing microscope and was heated at a rate of 1° C. per minute. Temperature when part of the sample began to change from a nematic phase to an isotropic liquid was measured. A higher limit of a temperature range of the nematic phase may be occasionally abbreviated as "maximum temperature."

Minimum Temperature of a Nematic Phase ($T_c$; ° C.): A sample having a nematic phase was put in glass vials and kept in freezers at 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was described as "$T_c$<−20° C." A lower limit of the temperature range of the nematic phase may be occasionally abbreviated as "minimum temperature."

Viscosity (Bulk Viscosity; η; Measured at 20° C.; mPa·s): A cone-plate (E type) rotational viscometer was used for measurement.

Viscosity (Rotational Viscosity; γ1; Measured at 25° C.; mPa·s: Measurement was carried out according to the method described in M. Imai et al., Molecular Crystals and Liquid Crystals, Vol. 259, p. 37 (1995). A sample was put in a VA device in which a twist angle was 0 degrees and a distance (cell gap) between two glass substrates was 20 micrometers. Voltage was stepwise applied to the device in the range of 39 V to 50 V at an increment of 1 V. After a period of 0.2 second with no application, voltage was applied repeatedly under the conditions of only one of rectangular waves (rectangular pulse; 0.2 second) and no application (2 seconds). A peak current and a peak time of a transient current generated by the application were measured. A value of rotational viscosity was obtained from the measured values and calculation equation (8) on page 40 of the paper presented by M. Imai et al. A value of dielectric anisotropy necessary for the calculation was determined according to a method as described below by using the device used for measuring the rotational viscosity.

Optical Anisotropy (Refractive Index Anisotropy; $\Delta n$; Measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index ($n_{\parallel}$) was measured when the direction of polarized light was parallel to the direction of rubbing. A refractive index ($n_{\perp}$) was measured when the direction of polarized light was perpendicular to the direction of rubbing. A value of optical anisotropy was calculated from an equation: $\Delta n = n_{\parallel} - n_{\perp}$.

Dielectric Anisotropy ($\Delta\epsilon$; Measured at 25° C.): A value of dielectric anisotropy was calculated from an equation: $\Delta\epsilon = \epsilon_{\parallel} - \epsilon_{\perp}$. Dielectric constants ($\epsilon_{\parallel}$ and $\epsilon_{\perp}$) were measured as described below.

(1) Measurement of dielectric constant ($\epsilon_{\parallel}$): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant ($\epsilon_{81}$) in the major axis direction of liquid crystal molecules was measured.

(2) Measurement of dielectric constant ($\epsilon_{\perp}$): A polyimide solution was applied to a well-washed glass substrate. After calcinating the glass substrate, rubbing treatment was applied to an alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant ($\epsilon_{\perp}$) in the minor axis direction of the liquid crystal molecules was measured.

Threshold Voltage (Vth; Measured at 25° C.; V): An LCD-5100 luminance meter made by Otsuka Electronics Co., Ltd. was used for measurement. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. Voltage (60 Hz, rectangular waves) to be applied to the device was increased stepwise from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 10% transmittance.

Voltage Holding Ratio (VHR-1; Measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; Measured at 80° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; Measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In VHR-3 measurement, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; Measured at 25° C.; %): A TN device into which a sample was injected was heated in a constant-temperature bath at 80° C. for 500 hours, and then stability to heat was evaluated by measuring a voltage holding ratio. In VHR-4 measurement, a decaying voltage was measured 1 for 6.7 milliseconds. A composition having a large VHR-4 has a large stability to heat.

Response Time ($\tau$; Measured at 25° C.; ms): An LCD-5100 luminance meter made by Otsuka Electronics Co., Ltd. was used for measurement. A light source was a halogen lamp. A low-pass filter was set at 5 kHz. A sample was put in a normally black mode VA device in which a distance (cell gap) between two glass substrates was 4 micrometers and a rubbing direction was anti-parallel, and the device was sealed with an ultraviolet-curable adhesive. Rectangular waves (60 Hz, 10 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. A response time is a period of time required for a change from 90% transmittance to 10% transmittance (fall time; millisecond).

Specific Resistance ($\rho$; Measured at 25° C.; $\Omega$cm): Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

Elastic Constant (K11: Spray Elastic Constant, K33: Bend Elastic Constant; Measured at 25° C.; pN): Elastic Constant Measurement System Model EC-1 made by TOYO Corporation was used for measurement. A sample was put in a homeotropic alignment cell in which a distance (cell gap) between two glass substrates was 20 micrometers. An electric charge from 20 V to 0 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.) and a value of elastic constant was obtained from equation (2.100).

$^1$H-NMR Analysis: As a measuring apparatus, DRX-500 (made by Bruker BioSpin Corporation) was used. A sample prepared in Example and so forth was dissolved into a deuterated solvent such as $CDCl_3$ in which the sample was soluble, and measurement was carried out under the conditions of room temperature, 500 MHz and 24 times of accumulation. In addition, in explaining nuclear magnetic resonance spectra obtained, s, d, t, q and m stand for a singlet, a doublet, a triplet, a quartet and a multiplet, respectively. Tetramethylsilane (TMS) was used as a reference material for a zero point of chemical shifts (δvalues). $^{19}$F-NMR analysis was also conducted by means of the same device.

Gas Chromatographic Analysis: GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary liquid phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1 wt %), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds included in the composition may also be calculated by the method as described below. The liquid crystal compounds can be detected by means of a gas chromatograph. A ratio of the peak areas in the gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (wt %) of the liquid crystal compounds was calculated from the ratio of the peak areas.

The invention will be explained in detail by way of Examples. The invention is not limited by the Examples described below. The compounds in Comparative Examples and Examples were described using symbols according to definitions in Table 3 below. In Table 3, a configuration of 1,4-cyclohexylene is trans. A parenthesized number next to a symbolized compound corresponds to the number of the compound. A symbol (–) means any other liquid crystal compound. A ratio (percentage) of the liquid crystal compounds is expressed in terms of weight percent (wt %) based on the total weight of the liquid crystal composition. The liquid crystal composition further includes an impurity in addition thereto. Last, values of characteristics of the composition were summarized.

TABLE 3

Method for Description of Compounds using Symbols
R—($A_1$)—$Z_1$—····—$Z_n$—($A_n$)—R'

| 1) Left-terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| F—$C_nH_{2n}$— | Fn— |

| 2) Right-terminal Group —R' | Symbol |
|---|---|
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —$OC_nH_{2n}$—CH=$CH_2$ | —OnV |

| 3) Bonding Group —$Z_n$— | Symbol |
|---|---|
| —$CF_2O$— | X |
| —$C_nH_{2n}$— | n |
| —COO— | E |
| —CH=CH— | V |
| —$CH_2O$— | 1O |
| —$OCH_2$— | O1 |
| —$OC_2H_4O$— | O2O |

| 4) Ring Structure —$A_n$— | Symbol |
|---|---|
|  | H |
|  | Ch |
|  | B |
| 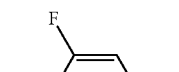 | B(2F) |
| 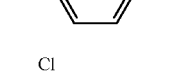 | B(2CL) |
|  | B(F) |

TABLE 3-continued

Method for Description of Compounds using Symbols
R—(A$_1$)—Z$_1$—·····—Z$_n$—(A$_n$)—R'

| Structure | Symbol |
|---|---|
| (2,3-difluorophenylene) | B(2F,3F) |
| (2-fluoro-3-chlorophenylene) | B(2F,3CL) |
| (2-chloro-3-fluorophenylene) | B(2CL,3F) |
| (3,6-difluorophenylene) | B(3F,6F) |
| (2,3-difluoro-6-methylphenylene) | B(2F,3F,6Me) |
| (tetrahydropyran, 2,5-linked) | dh |
| (tetrahydropyran, 2,5-linked isomer) | Dh |
| (7,8-difluorochroman) | Cro(7F,8F) |

5) Examples of Description

Example 1     3-HH-V1

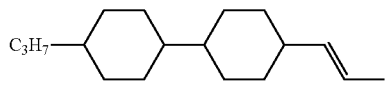

Example 2     3-HHB(2F,3F)-O2

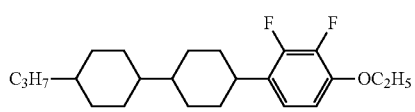

Comparative Example 1

A liquid crystal composition containing a compound similar to compound (1) was prepared, and measurement was carried out by the method described above. Components and characteristics of the composition are as described below.

| | | |
|---|---|---|
| 2-HH-3 | Similar to (1) | 25% |
| 3-HH-5 | Similar to (1) | 5% |
| 3-HH-4 | Similar to (1) | 10% |
| 3-BB(2F,3F)-O2 | (2-4-1) | 5% |
| 2O-BB(2F,3F)-O2 | (2-4) | 6% |
| V-HHB(2F,3F)-O2 | (2-6-1) | 8% |
| 3-HH1OB(2F,3F)-O2 | (2-8-1) | 24% |
| 2-BB(2F,3F)B-3 | (2-9-1) | 7% |
| 1-BB-3 | (3-2-1) | 10% |

NI=75.4° C.; Tc<20° C.; $\gamma 1$=59.3 mPa·s; $\Delta n$=0.101; $\Delta \epsilon$=−3.1; Vth=2.33 V; VHR-1=98.8%; VHR-2=97.6%; K33=13.8 pN; $\gamma 1/K33$=4.30 GPa·s/N.

Comparative Example 2

Example 3 was selected from the compositions disclosed in WO 2011/98202 A. The reason is that the composition disclosed in Example 3 contains compound (1-1-1), compound (1-2-1), compound (2-1-1), compound (2-6-1) and compound (2-13-1), and has a smallest ratio of rotational viscosity to an elastic constant.

| | | |
|---|---|---|
| 3-HVB(2F,3F)-O2 | (—) | 19% |
| 5-HB(2F,3F)-O2 | (2-1-1) | 5% |
| 3-HHB(2F,3F)-O2 | (2-6-1) | 5% |
| 2-HChB(2F,3F)-O4 | (—) | 4% |
| 3-HChB(2F,3F)-O2 | (—) | 4% |
| 3-HChB(2F,3F)-O3 | (—) | 4% |
| 2-HBB(2F,3F)-O2 | (2-13-1) | 6% |
| 3-HBB(2F,3F)-O2 | (2-13-1) | 8% |
| 3-HH-V | (1-1-1) | 38% |
| 3-HH-V1 | (1-2-1) | 7% |

NI=82.0° C.; $\gamma 1$=88.0 mPa·s; $\Delta n$=0.098; $\Delta \epsilon$=−3.1; Vth=2.43 V; K33=16.4 pN; $\gamma 1/K33$=5.37 GPa·s/N.

Comparative Example 3

Example M2 was selected from the compositions disclosed in JP 2008-505235 A. The reason is that the composition disclosed in Example M2 contains compound (1), compound (1-1-1), compound (1-2-1), compound (2-1-1), compound (2-6-1) and compound (2-13-1), and has a smallest ratio of rotational viscosity to an elastic constant.

| | | |
|---|---|---|
| 3-HB(2F,3F)-O4 | (2-1-1) | 18% |
| 5-HB(2F,3F)-O4 | (2-1-1) | 14% |
| 3-HHB(2F,3F)-O2 | (2-6-1) | 5% |
| 5-HHB(2F,3F)-O2 | (2-6-1) | 8% |
| 2-HBB(2F,3F)-O2 | (2-13-1) | 3% |
| 3-HBB(2F,3F)-O2 | (2-13-1) | 10% |
| 3-HH-V1 | (1-2-1) | 12% |
| 5-HH-V | (1-1-1) | 15% |
| 3-HH-2V | (1) | 10% |
| 3-HH-5 | Similar to (1) | 5% |

NI=70.5° C.; $\gamma 1$=102.0 mPa·s; $\Delta n$=0.083; $\Delta \epsilon$=−3.1; Vth=2.27 V; K33=14.4 pN; $\gamma 1/K33$=7.08 GPa·s/N.

Comparative Example 4

Example 1-3 was selected from the compositions disclosed in JP 2008-505228 A. The reason is that the composition disclosed in Example 1-3 contains compound (1-1-1), compound (1-2-1), compound (2-1-1), compound (2-6-1), compound (2-13-1) and compound (3-4-1), and has a smallest ratio of rotational viscosity to an elastic constant.

| | | |
|---|---|---|
| 3-HB(2F,3F)-O4 | (2-1-1) | 12% |
| 5-HB(2F,3F)-O2 | (2-1-1) | 12% |
| 5-HB(2F,3F)-O4 | (2-1-1) | 12% |
| 3-HHB(2F,3F)-O2 | (2-6-1) | 11% |
| 5-HHB(2F,3F)-O2 | (2-6-1) | 10% |
| 2-HBB(2F,3F)-O2 | (2-13-1) | 8% |
| 3-HH-V | (1-1-1) | 16% |
| 3-HH-V1 | (1-2-1) | 9% |
| 3-HH-5 | Similar to (1) | 8% |
| V-HHB-1 | (3-4-1) | 2% |

NI=70.0° C.; $\gamma1$=113.0 mPa·s; $\Delta n$=0.083; $\Delta\varepsilon$=−3.8; Vth=2.08 V; K33=14.6 pN; $\gamma1$/K33=7.74 GPa·s/N.

Example 1

A compound similar to compound (1) in Comparative Example 1 was replaced by any of compounds (1-1-1) and (1-2-1). A composition as described below was prepared and measurement was carried out by the method described above. Components and characteristics of the composition are as described below. The composition in Example 1 has a smaller ratio of rotational viscosity to an elastic constant, as compared with the composition in Comparative Example 1.

| | | |
|---|---|---|
| 3-HH-V | (1-1-1) | 25% |
| 2-HH-V1 | (1-2-1) | 5% |
| 3-HH-V1 | (1-2-1) | 10% |
| 3-BB(2F,3F)-O2 | (2-4-1) | 5% |
| 2O-BB(2F,3F)-O2 | (2-4) | 6% |
| V-HHB(2F,3F)-O2 | (2-6-1) | 8% |
| 3-HH1OB(2F,3F)-O2 | (2-8-1) | 24% |
| 2-BB(2F,3F)B-3 | (2-9-1) | 7% |
| 1-BB-3 | (3-2-1) | 10% |

NI=75.0° C.; Tc<−20° C.; $\gamma1$=56.1 mPa·s; $\Delta n$=0.106; $\Delta\varepsilon$=−3.0; Vth=2.47 V; VHR-1=99.1%; VHR-2=98.0%; K33=15.6 pN; $\gamma1$/K33=3.60 GPa·s/N.

Example 2

| | | |
|---|---|---|
| 3-HH-V | (1-1-1) | 27% |
| 3-HH-V1 | (1-2-1) | 11% |
| 4-HH-V1 | (1-2-1) | 4% |
| 3-BB(2F,3F)-O2 | (2-4-1) | 6% |
| 2O-BB(2F,3F)-O2 | (2-4) | 7% |
| 2O-B(2F,3F)B(2F,3F)-O6 | (2-5) | 3% |
| 3-HHB(2F,3F)-O2 | (2-6-1) | 8% |
| 3-HH1OB(2F,3F)-O2 | (2-8-1) | 19% |
| 2-BB(2F,3F)B-3 | (2-9-1) | 7% |
| V2-BB-1 | (3-2-1) | 5% |
| 3-HHEH-3 | (3-3-1) | 3% |

NI=79.3° C.; Tc<−20° C.; $\gamma1$=61.0 mPa·s; $\Delta n$=0.103; $\Delta\varepsilon$=−3.1; Vth=2.52 V; VHR-1=99.0%; VHR-2=97.8%; K33=17.0 pN; $\gamma1$/K33=3.59 GPa·s/N.

Example 3

| | | |
|---|---|---|
| 3-HH-V | (1-1-1) | 25% |
| V-HH-V | (1-1) | 3% |
| 3-HH-V1 | (1-2-1) | 12% |
| 3-HB(2F,3F)-O2 | (2-1-1) | 9% |
| V-HHB(2F,3F)-O2 | (2-6-1) | 7% |
| 3-HH1OB(2F,3F)-O2 | (2-8-1) | 24% |
| 2-BB(2F,3F)B-3 | (2-9-1) | 7% |
| 3-HDhB(2F,3F)-O2 | (2-11-1) | 4% |
| 3-HB-O2 | (3-1) | 9% |

NI=79.8° C.; Tc<−20° C.; $\gamma1$=60.7 mPa·s; $\Delta n$=0.088; $\Delta\varepsilon$=−3.1; Vth=2.46 V; VHR-1=99.0%; VHR-2=98.1%; K33=16.4 pN; $\gamma1$/K33=3.70 GPa·s/N.

Example 4

| | | |
|---|---|---|
| 3-HH-V | (1-1-1) | 21% |
| 3-HH-V1 | (1-2-1) | 9% |
| 4-HH-V1 | (1-2-1) | 6% |
| 3-H2B(2F,3F)-O2 | (2-2-1) | 14% |
| 5-H2B(2F,3F)-O2 | (2-2-1) | 13% |
| 3-HBB(2F,3F)-O2 | (2-13-1) | 5% |
| 3-HHB(2F,3CL)-O2 | (2-16-1) | 3% |
| 4-HHB(2F,3CL)-O2 | (2-16-1) | 3% |
| 5-HHB(2F,3CL)-O2 | (2-16-1) | 3% |
| 3-HBB(2F,3CL)-O2 | (2-17-1) | 8% |
| 5-HBB(2F,3CL)-O2 | (2-17-1) | 8% |
| V-HHB-1 | (3-4-1) | 3% |
| 3-HHEBH-3 | (3-8-1) | 4% |

NI=82.0° C.; Tc<−20° C.; $\gamma1$=64.5 mPa·s; $\Delta n$=0.091; $\Delta\varepsilon$=−2.9; Vth=2.45 V; VHR-1=98.6%; VHR-2=97.7%; K33=17.8 pN; $\gamma1$/K33=3.62 GPa·s/N.

Example 5

| | | |
|---|---|---|
| 3-HH-V | (1-1-1) | 30% |
| 3-HH-V1 | (1-2-1) | 10% |
| 3-HH-VFF | (1) | 3% |
| 3-H2B(2F,3F)-O2 | (2-2-1) | 10% |
| 5-H2B(2F,3F)-O2 | (2-2-1) | 9% |
| 3-H1OB(2F,3F)-O2 | (2-3-1) | 5% |
| 3-DhHB(2F,3F)-O2 | (2-10-1) | 5% |
| 3-HBB(2F,3F)-O2 | (2-13-1) | 6% |
| 5-HBB(2F,3F)-O2 | (2-13-1) | 5% |
| 3-HEB(2F,3F)B(2F,3F)-O4 | (2-15-1) | 3% |
| 3-HH1OCro(7F,8F)-5 | (2-19-1) | 5% |
| 3-HHB-O1 | (3-4) | 3% |
| 3-HB(F)BH-3 | (3-11-1) | 3% |
| 5-HBB(F)B-2 | (3-12-1) | 3% |

NI=76.7° C.; Tc<−20° C.; $\gamma1$=52.3 mPa·s; $\Delta n$=0.088; $\Delta\varepsilon$=−2.8; Vth=2.57 V; VHR-1=98.8%; VHR-2=97.9%; K33=13.7 pN; $\gamma1$/K33=3.82 GPa·s/N.

Example 6

| | | |
|---|---|---|
| 3-HH-V | (1-1-1) | 24% |
| 4-HH-V1 | (1-2-1) | 8% |

-continued

| | | |
|---|---|---|
| 3-HH-2V1 | (1-3-1) | 5% |
| 3-HB(2F,3F)-O2 | (2-1-1) | 13% |
| 5-HB(2F,3F)-O2 | (2-1-1) | 11% |
| 5-DhH1OB(2F,3F)-O2 | (2-12-1) | 6% |
| 3-HBB(2F,3F)-O2 | (2-13-1) | 9% |
| 3-dhBB(2F,3F)-O2 | (2-14-1) | 3% |
| 3-H1OCro(7F,8F)-5 | (2-18-1) | 3% |
| 3-HBB-2 | (3-5-1) | 3% |
| 2-BB(F)B-3 | (3-7-1) | 3% |
| 1-BB(F)B-2V | (3-7-1) | 3% |
| 3-HB(F)HH-5 | (3-9-1) | 3% |
| 5-HB(F)HH-V | (3-9-1) | 3% |
| 5-HBBH-3 | (3-10-1) | 3% |

NI=79.5° C.; Tc<−20° C.; γ1=56.0 mPa·s; Δn=0.100; Δ∈=−2.7; Vth=2.40 V; VHR-1=98.7%; VHR-2=97.8%; K33=13.7 pN; γ1/K33=4.09 GPa·s/N.

Example 7

| | | |
|---|---|---|
| 3-HH-V | (1-1-1) | 21% |
| 4-HH-V | (1-1-1) | 3% |
| 2-HH-V1 | (1-2-1) | 4% |
| 3-HH-V1 | (1-2-1) | 9% |
| 4-HH-V1 | (1-2-1) | 3% |
| 3-H1OB(2F,3F)-O2 | (2-3-1) | 3% |
| 3-BB(2F,3F)-O2 | (2-4-1) | 3% |
| 2O-BB(2F,3F)-O2 | (2-4) | 5% |
| V-HHB(2F,3F)-O2 | (2-6-1) | 8% |
| 3-HH2B(2F,3F)-O2 | (2-7-1) | 5% |
| 3-HH1OB(2F,3F)-O2 | (2-8-1) | 19% |
| 2-BB(2F,3F)B-3 | (2-9-1) | 7% |
| 7-HB-1 | (3-1-1) | 4% |
| 5-B(F)BB-2 | (3-6-1) | 3% |
| 2-HH-3 | Similar to (1) | 3% |

NI=81.9° C.; Tc<−20° C.; γ1=59.5 mPa·s; Δn=0.096; Δ∈=−3.0; Vth=2.58 V; VHR-1=99.0%; VHR-2=97.7%; K33=16.8 pN; γ1/K33=3.54 GPa·s/N.

Example 8

| | | |
|---|---|---|
| 3-HH-V | (1-1-1) | 25% |
| 2-HH-V1 | (1-2-1) | 5% |
| 3-HH-V1 | (1-2-1) | 10% |
| 4-HH-V1 | (1-2-1) | 3% |
| 3-BB(2F,3F)-O2 | (2-4-1) | 6% |
| 2O-BB(2F,3F)-O2 | (2-4) | 7% |
| 2O-B(2F,3F)B(2F,3F)-O6 | (2-5) | 3% |
| 3-HHB(2F,3F)-O2 | (2-6-1) | 8% |
| 3-HH1OB(2F,3F)-O2 | (2-8-1) | 19% |
| 2-BB(2F,3F)B-3 | (2-9-1) | 7% |
| V2-BB-1 | (3-2-1) | 4% |
| 3-HHEH-3 | (3-3-1) | 3% |

NI=79.1° C.; Tc<−20° C.; γ1=59.7 mPa·s; Δn=0.101; Δ∈=−3.1; Vth=2.51 V; VHR-1=99.1%; VHR-2=97.7%; K33=17.1 pN; γ1/K33=3.49 GPa·s/N.

Example 9

| | | |
|---|---|---|
| 3-HH-V | (1-1-1) | 24% |
| 2-HH-V1 | (1-2-1) | 5% |
| 3-HH-V1 | (1-2-1) | 9% |
| 4-HH-V1 | (1-2-1) | 6% |
| 3-BB(2F,3F)-O2 | (2-4-1) | 6% |
| 2O-BB(2F,3F)-O2 | (2-4) | 7% |
| 3-HHB(2F,3F)-O2 | (2-6-1) | 8% |
| 3-HH1OB(2F,3F)-O2 | (2-8-1) | 20% |
| 2-BB(2F,3F)B-3 | (2-9-1) | 7% |
| V2-BB-1 | (3-2-1) | 5% |
| 3-HHEH-3 | (3-3-1) | 3% |

NI=81.5° C.; Tc<−20° C.; γ1=59.6 mPa·s; Δn=0.101; Δ∈=−2.9; Vth=2.60 V; VHR-1=98.9%; VHR-2=97.8%; K33=17.2 pN; γ1/K33=3.47 GPa·s/N.

The compositions in Example 1 to Example 9 have a smaller ratio of rotational viscosity to the elastic constant, as compared with the compositions in Comparative Example 1 to Comparative Example 4. Therefore, the liquid crystal composition of the invention has the characteristics superior to the characteristics of the liquid crystal compositions in Comparative Examples.

Industrial Applicability

The invention concerns a liquid crystal composition satisfying at least one of characteristics such as a high maximum temperature of a nematic phase, a low minimum temperature of the nematic phase, a small viscosity, a large optical anisotropy, a large dielectric anisotropy, a large specific resistance, a high stability to ultraviolet light, a high stability to heat, a large elastic constant and a small ratio of viscosity to an elastic constant, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used for a liquid crystal projector, a liquid crystal television and so forth.

What is claimed is:

1. A liquid crystal composition that has a negative dielectric anisotropy and a ratio of rotational viscosity (γ1) to an elastic constant (K33) in a range of 4.2 GPa·s/N or less, and contains a compound represented by formula (1-1) as a first component, and at least one compound represented by formula (2) as a second component, wherein a ratio of the first component is in a range of 15 wt % to 90 wt % based on a total weight of the liquid crystal composition:

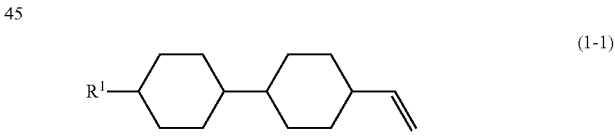

(1-1)

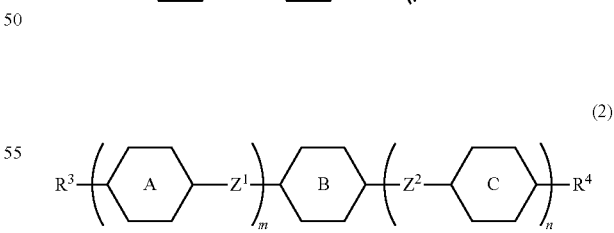

(2)

wherein $R^1$ is propyl; $R^3$ and $R^4$ are independently alkyl having 1 to 12 carbons, alkoxy having 1 to 12 carbons, alkenyl having 2 to 12 carbons, alkenyloxy having 2 to 12 carbons, alkyl having 1 to 12 carbons in which at least one hydrogen is replaced by fluorine, or alkenyl having 2 to 12 carbons in which at least one hydrogen is replaced by fluorine; ring A and ring C are independently 1,4-cyclohexylene, 1,4-phenylene, 1,4-phenylene in which at least one hydrogen is replaced by fluorine or chlorine, or tetrahydropyran-2,5-diyl; ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^1$ and $Z^2$ are independently a single bond, ethylene, methyleneoxy or carbonyloxy; m is 1, 2 or 3; and n is 0 or 1, and a sum of m and n is 3 or less, and wherein at least one compound in the second component is represented by formula (2-4-1):

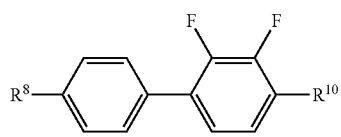
(2-4-1)

wherein $R^8$ is straight-chain alkyl having 1 to 12 carbons or straight-chain alkenyl having 2 to 12 carbons, and $R^{10}$ is straight-chain alkyl having 1 to 12 carbons or straight-chain alkoxy having 1 to 12 carbons.

2. The liquid crystal composition according to claim 1, wherein the second component also includes at least one compound selected from the group of compounds represented by formula (2-1) to formula (2-19) other than the at least one compound represented by formula (2-4-1):

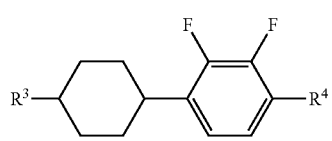
(2-1)

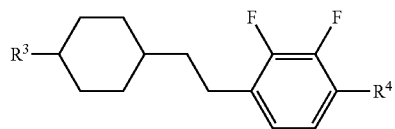
(2-2)

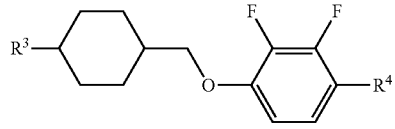
(2-3)

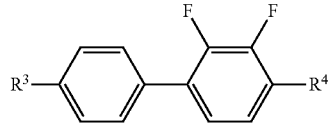
(2-4)

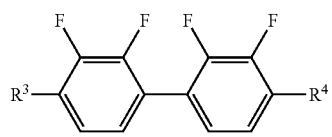
(2-5)

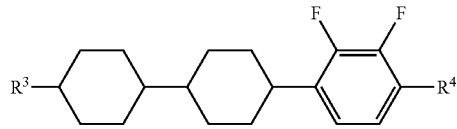
(2-6)

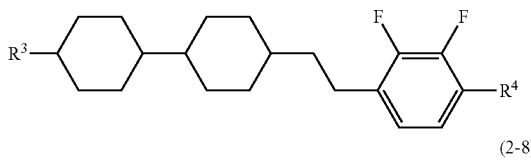
(2-7)

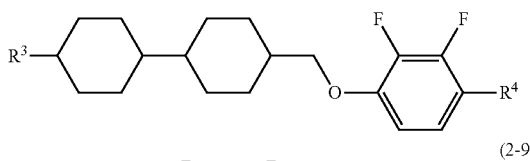
(2-8)

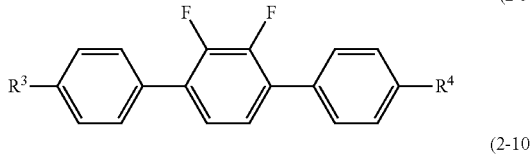
(2-9)

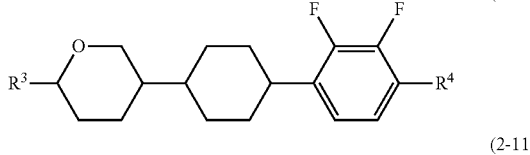
(2-10)

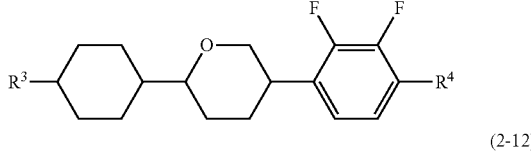
(2-11)

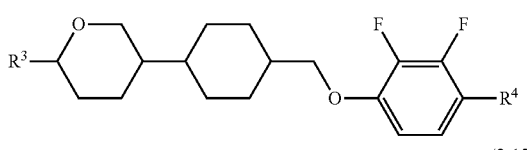
(2-12)

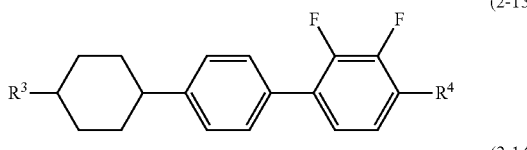
(2-13)

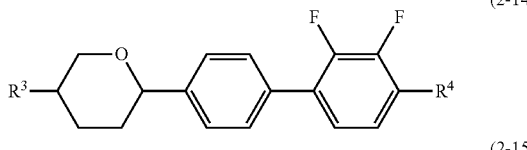
(2-14)

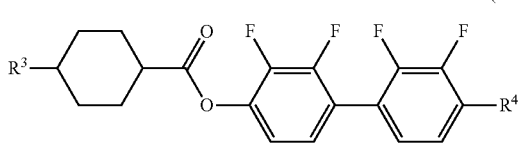
(2-15)

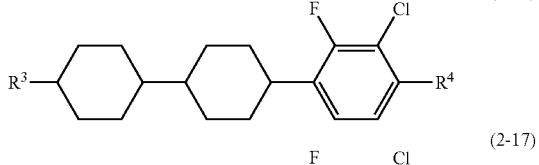
(2-16)

(2-17)

(2-18)
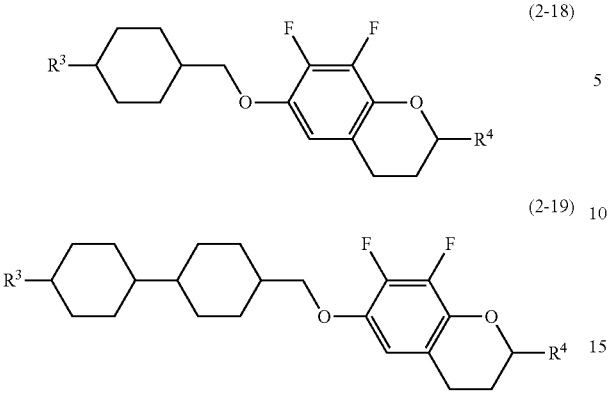
(2-19)

wherein R³ and R⁴ are independently alkyl having 1 to 12 carbons, alkoxy having 1 to 12 carbons, alkenyl having 2 to 12 carbons, alkenyloxy having 2 to 12 carbons, alkyl having 1 to 12 carbons in which at least one hydrogen is replaced by fluorine, or alkenyl having 2 to 12 carbons in which at least one hydrogen is replaced by fluorine.

3. The liquid crystal composition according to claim 1, wherein a ratio of the second component is in a range of 10 wt % to 85 wt % based on a total weight of the liquid crystal composition.

4. The liquid crystal composition according to claim 1, further containing at least one compound represented by formula (3) as a third component:

(3)
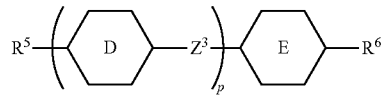

wherein R⁵ and R⁶ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring D and ring E are independently 1,4-cyclohexylene, 1,4-phenylene, 2-fluoro-1,4-phenylene or 3-fluoro-1,4-phenylene, and when p is 1, the ring E is 1,4-phenylene; Z³ is independently a single bond, ethylene, methyleneoxy or carbonyloxy; and p is 1, 2 or 3.

5. The liquid crystal composition according to claim 4, wherein the third component is at least one compound selected from the group of compounds represented by formula (3-1) to formula (3-12):

(3-1)
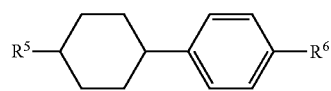

(3-2)
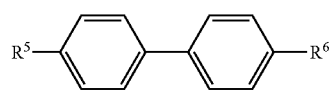

(3-3)
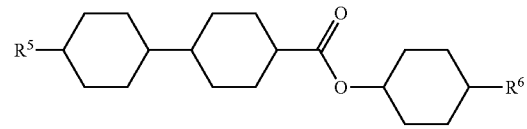

(3-4)
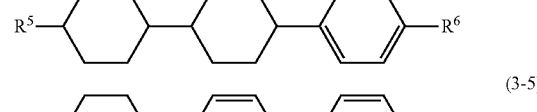

(3-5)
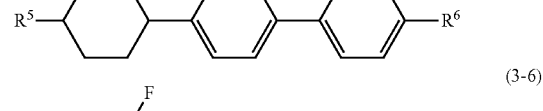

(3-6)
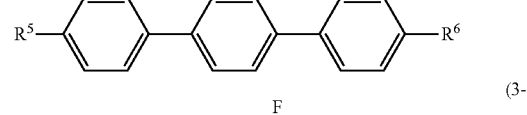

(3-7)
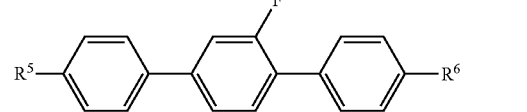

(3-8)
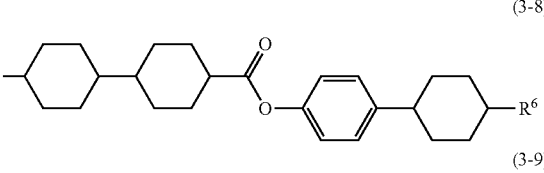

(3-9)
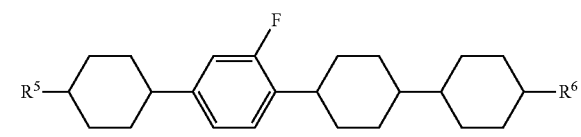

(3-10)
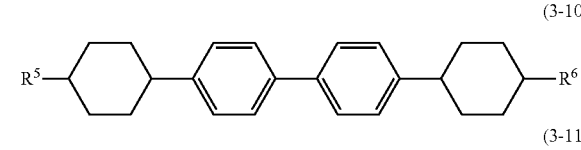

(3-11)
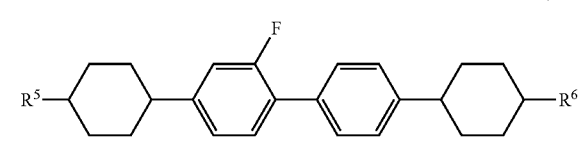

(3-12)
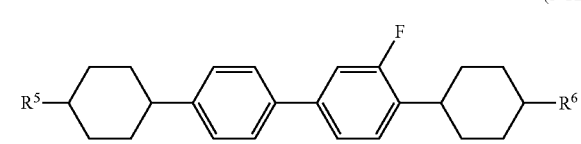

wherein R⁵ and R⁶ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

6. The liquid crystal composition according to claim 4, wherein a ratio of the third component is in a range of 5 wt% to 40 wt% based on a total weight of the liquid crystal composition.

7. The liquid crystal composition according to claim 1, wherein a maximum temperature of a nematic phase is 70° C.

or higher, an optical anisotropy (25° C.) at a wavelength of 589 nanometers is 0.08 or more, and a dielectric anisotropy (25° C.) at a frequency of 1 kHz is −2 or less.

8. A liquid crystal display device, comprising the liquid crystal composition according to claim 1.

9. The liquid crystal display device according to claim 8, wherein an operating mode in the liquid crystal display device is a VA mode, an IPS mode, a PSA mode or a FPA mode, and a driving mode in the liquid crystal display device is an active matrix mode.

* * * * *